United States Patent [19]
Szekely

[11] Patent Number: 5,139,765
[45] Date of Patent: Aug. 18, 1992

[54] DUAL COMBUSTION ZONE SULFUR RECOVERY PROCESS

[75] Inventor: Andrew G. Szekely, Yorktown, N.Y.

[73] Assignee: Union Carbide Industrial Gases Technology Corporation, Danbury, Conn.

[21] Appl. No.: 707,230

[22] Filed: May 24, 1991

Related U.S. Application Data

[63] Continuation of Ser. No. 471,387, Jan. 29, 1990, abandoned, which is a continuation-in-part of Ser. No. 146,722, Jan. 21, 1988, abandoned.

[51] Int. Cl.$^5$ .......................... C01B 17/04; F23C 9/06; F23D 14/32
[52] U.S. Cl. .................................. 423/574 R; 422/160; 431/9
[58] Field of Search ............... 423/542, 574 R; 431/8, 431/9, 2, 23, 160, 356; 422/160, 161

[56] References Cited

U.S. PATENT DOCUMENTS

| | | | |
|---|---|---|---|
| 2,043,084 | 6/1936 | Ward et al. | 423/574 L |
| 2,945,748 | 7/1960 | Magill | 423/574 R |
| 3,681,024 | 8/1972 | Hujsak et al. | 423/574 R |
| 3,822,341 | 7/1974 | Smith | 423/574 R |
| 4,138,473 | 2/1979 | Gieck | 423/574R |
| 4,153,674 | 5/1979 | Verloop et al. | 423/574 R |
| 4,279,882 | 7/1981 | Beavon | 423/574 R |
| 4,287,857 | 9/1981 | Schnitzer | 431/9 |
| 4,411,616 | 10/1983 | Neumann | 431/2 |
| 4,426,369 | 1/1984 | Palm | 423/574 R |
| 4,430,317 | 2/1984 | Reed et al. | 423/574 R |
| 4,526,590 | 7/1985 | Palm et al. | 55/27 |
| 4,533,529 | 8/1985 | Lee | 423/230 |
| 4,552,747 | 11/1985 | Goar | 423/574 R |
| 4,632,819 | 12/1986 | Fischer et al. | 423/574 R |
| 4,684,514 | 8/1987 | Chen | 423/574 R |
| 4,780,305 | 10/1988 | Steppe | 423/574 R |
| 4,878,829 | 11/1989 | Anderson | 431/8 |
| 4,933,163 | 6/1990 | Fischer et al. | 423/574 R |

FOREIGN PATENT DOCUMENTS

| | | | |
|---|---|---|---|
| 4411616 | 1/1983 | Japan | 431/356 |
| 8501901 | 2/1986 | Netherlands | 423/574 R |
| 1181992 | 9/1985 | U.S.S.R. | 423/574 R |
| 2187444 | 9/1987 | United Kingdom | 423/574 R |

OTHER PUBLICATIONS

Perry's Chemical Engineers Handbook, 6th ed. Green et al., eds. McGraw-Hill Book Co., 1984, pp. 9-69.
Opekar et al., "How A Computer Can Optimize Sulfur Plant Design Operations", The Oil and Gas Journal, May 2, 1966.

Primary Examiner—Jeffrey E. Russel
Attorney, Agent, or Firm—Stanley Ktorides

[57] ABSTRACT

A sulfur recovery process wherein a minor fraction of a hydrogen sulfide-containing gas is precombusted with oxygen in an externally cooled combustion zone while extracting the major fraction of the heat released in the substantially complete combustion of hydrogen sulfide to sulfur dioxide in that zone, the gas is further cooled and is then passed to a Claus reaction furnace together with the major fraction of the gas, enabling using oxygen for a substantial productivity increase within the temperature and flow rate limitations of a Claus plant without need for a temperature moderator introduced into the precombustor.

15 Claims, 2 Drawing Sheets

DUAL COMBUSTION ZONE SULFUR RECOVERY PROCESS

This application is a continuation of prior U.S. application Ser. No. 471,387, filed Jan. 29, 1990 now abandoned which is a continuation-in-part of application Ser. No. 146,722, filed Jan. 21, 1988, now abandoned.

TECHNICAL FIELD

This invention relates generally to the field of Claus sulfur recovery and is particularly advantageous in a process wherein the feed gas is combusted with oxygen or oxygen-enriched air.

BACKGROUND ART

The Claus process is widely used to produce sulfur from acid gas and other gases containing hydrogen sulfide In the modified Claus process feed gas containing hydrogen sulfide is partially combusted with air to form sulfur dioxide. The uncombusted hydrogen sulfide reacts with sulfur dioxide forming sulfur and water in a reaction furnace. The reaction stream is cooled and the sulfur is condensed and recovered. The reaction stream is then passed through one or more catalytic converters wherein additional sulfur is produced in these catalytic stages by the reaction of previously unreacted hydrogen sulfide with sulfur dioxide.

The amount of oxygen provided to the process is such as to be sufficient to combust about one-third of the incoming hydrogen sulfide as well as all of the other combustibles in the feed gas. This provides the proper stoichiometry between hydrogen sulfide and sulfur dioxide for the subsequent Claus reaction. Since air contains only about 21 percent oxygen, a significant amount of inert nitrogen is passed through the system. Furthermore, if the hydrogen sulfide concentration in the feed gas were to increase or if a higher gas processing rate is required, a greater amount of oxygen would be needed thus requiring an even greater amount of inert nitrogen to pass through the system. The increased flow of nitrogen increases the pressure drops in the system, reduces the residence time of the reactants in the reactors and increases the gas volume to be treated in the tail gas treating unit. Nitrogen is an undesirable diluent in the Claus process which, however, cannot be avoided if the feed gas is combusted with air.

Those skilled in the art have addressed the problem of this unproductive nitrogen throughput by employing oxygen or oxygen-enriched air as the oxidant and this technique can reduce the amount of nitrogen which passes though the system.

However, where the incoming feed gas contains a large concentration i.e. greater than about 50 percent hydrogen sulfide and other combustibles, the temperature of the combustion reaction when oxygen or oxygen-enriched air is the oxidant can exceed the temperature tolerance of the refractories in the combustion zone.

Those skilled in the art have addressed the problem of high combustion zone temperatures by recycling a portion of the downstream flow back to the combustion zone to dilute the combustion zone reactants and consequently reduce the combustion temperature. For example, U.S. Pat. No. 3,681,024-Hujsak teaches recycling a portion of the gas effluent from the last sulfur condenser to the combustion zone and U.S. Pat. No. 4,552,747 - Goar teaches recycling a portion of the gas effluent from the first sulfur condenser to the combustion zone.

However a problem with recirculation processes is that because nearly as much recirculated gas is required on a heat capacity basis as nitrogen was replaced by oxygen enrichment, any significant increase in the production rate can be achieved only by an increase in the total gas input rate to the combustion zone. However, such an increase in the gas input rate increases the pressure drop in and downstream of the reaction furnace up to the point where a fraction of the main gas stream is to be diverted for recirculation. Furthermore, the equipment associated with the metering, regulation and repressurization of the recirculated gas is vulnerable to breakdowns and may jeopardize the continuous operation of the plant.

Other temperature moderating additives which have been used or proposed for use in the combustion zone of the Claus reaction furnace include liquid water, liquid sulfur and liquid sulfur dioxide. Temperature moderation is achieved by the absorption of some of the heat released in the combustion zone by the temperature moderating additive. However the imposition of such an additive on the process stream increases the flow rate through the thermal stage, and unless the additive is removed from the reaction stream before the catalytic stages, it increases the pressure drop through the entire Claus plant. Thus, temperature moderation in the Claus reaction furnace by heat absorbing additives reimposes some of the inactive fluid load on the process stream, the elimination of which load was the reason for using oxygen or oxygen-enriched air in the first place.

Thus it would be desirable to have a Claus process wherein oxygen or oxygen-enriched air can be employed as the oxidant and wherein recirculated gas or other temperature moderating additives are not needed to maintain non-excessive temperature in the combustion zone.

It is therefore an object of this invention to provide an improved process for the recovery of sulfur by the combustion of feed gas with oxygen or oxygen-enriched air without the need for gas recirculation back to the combustion zone or introduction of exogeneous temperature moderating additives into the combustion zone.

SUMMARY OF THE INVENTION

The above and other objects which will become apparent to one skilled in the art upon a reading of this disclosure are attained by this invention which is:

A process for producing sulfur from a feed gas containing hydrogen sulfide comprising:

(A) introducing a minor portion of the hydrogen sulfide containing feed gas into a first combustion zone having a heat conducting enclosure suitable for extracting heat by an external coolant;

(B) introducing first oxidant containing at least 90 percent oxygen into the first combustion zone;

(C) combusting substantially all of the hydrogen sulfide to sulfur dioxide in said minor portion with the first oxidant within the first combustion zone to produce combustion reaction products, while extracting at least 65 percent of the heat generated by this combustion by indirect heat exchange between the combustion reaction products and the external coolant;

(D) passing the combustion reaction products from the first combustion zone and further cooling the combustion reaction products;

(E) introducing the cooled combustion reaction products, second oxidant, and the major portion of the feed gas into a second combustion zone;

(F) combusting less than one-third of the hydrogen sulfide in the major portion of the feed gas with second oxidant in the second combustion zone to produce sulfur dioxide;

(G) reacting sulfur dioxide and hydrogen sulfide to produce sulfur;

(H) cooling the products of the second combustion zone in a heat exchanger; and (I) recovering sulfur as product.

As used herein, the term "indirect heat exchange" means the bringing of two fluids into heat exchange relation without any physical contact or intermixture of the fluids.

As used herein, the term "external coolant" means a fluid coolant which does not physically contact the combustion reactants or the combustion reaction products within the first combustion zone.

DETAILED DESCRIPTION

The process of this invention will be described in detail with reference to the Drawings.

Figure 1:
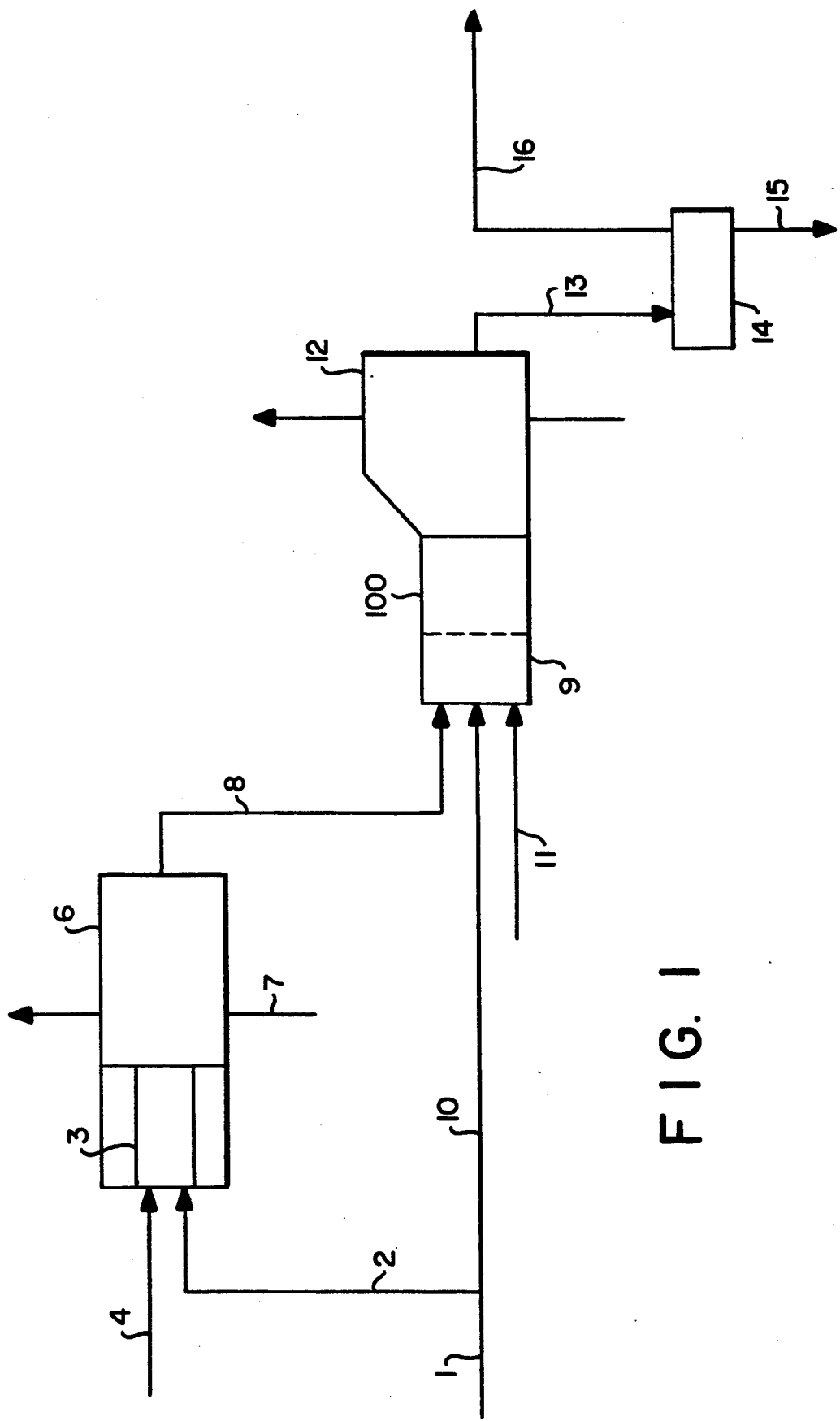
FIG. 1 is a simplified schematic flow diagram of one preferred embodiment of the process of this invention.

Referring now to FIG. 1, feed gas 1 comprises hydrogen sulfide and generally also contains a number of other constituents including carbon dioxide, hydrogen, and various hydrocarbons such as methane. The advantages of the process of this invention are most noticeable when the feed gas is an exothermic gas and the throughput capacity of a Claus plant processing such a gas is to be increased within the flowrate limitation of the existing plant. As used herein, "exothermic gas" means a hydrogen sulfide-containing gas which cannot be combusted with an oxidant containing more than 21 mole percent oxygen without generating excessive temperatures in the reaction furnace of a modified Claus plant. One example of an exothermic gas is an acid gas containing 60 mole percent or more of hydrogen sulfide.

A minor portion 2 of feed gas 1 is passed to first combustion zone 3 which is defined by a heat conducting enclosure and is externally cooled as will be discussed more fully later. Minor portion 2 preferably comprises less than 20 percent of feed gas 1. The distribution of feed gas 1 between minor portion 2 and major portion 10 is done by suitable valving not shown in the Figure.

First oxidant 4 is also passed into combustion zone 3 as a separate stream from minor portion 2 as shown in the Figure. First oxidant 4 may be oxygen-enriched air having an oxygen concentration of at least 90 percent or technically pure oxygen. As used herein "technically pure oxygen" means an oxidant having an oxygen concentration of at least 99 percent. The advantages of the process of this invention are most noticeable when technically pure oxygen is used as oxidant 4. Oxidant 4 is added to combustion zone 3 in an amount sufficient to enable substantially complete combustion of minor portion 2 of feed gas 1. Substantially all of the hydrogen sulfide in the minor portion of the feed gas is combusted to sulfur dioxide. The combustion reaction products are essentially steam and sulfur dioxide and generally also include carbon dioxide.

Figure 2:
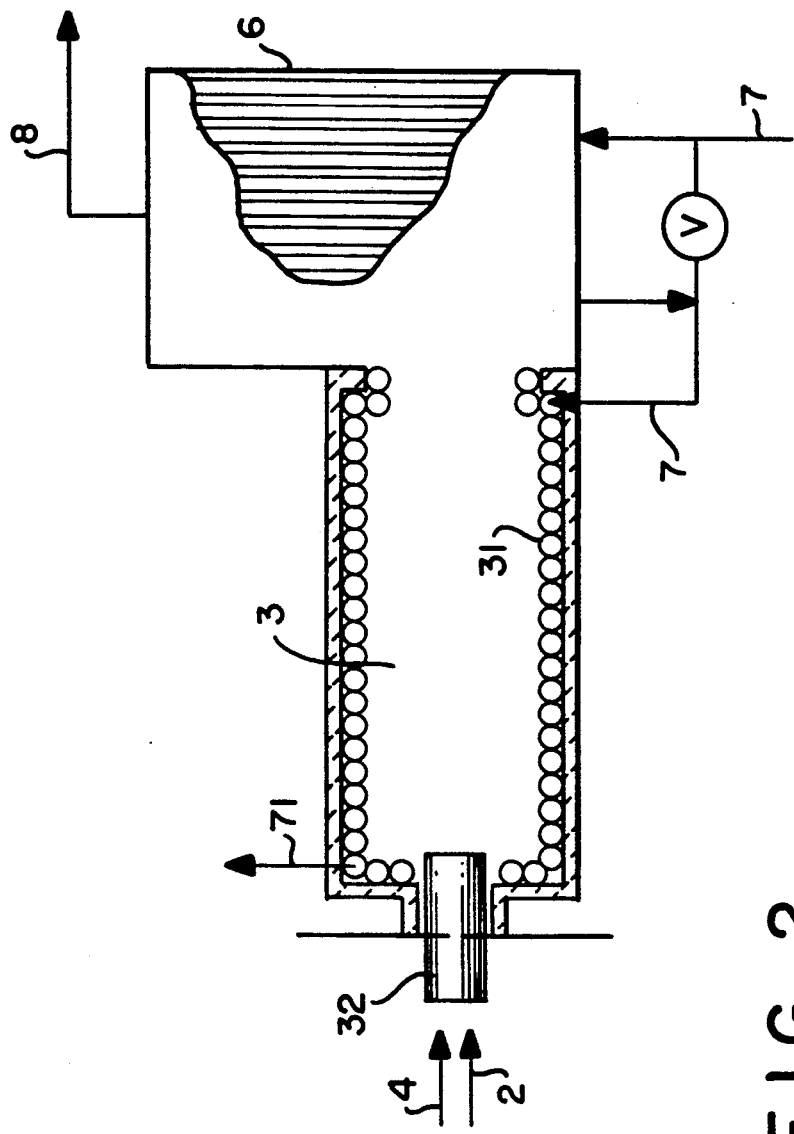
FIG. 2 is a cross-sectional representation of one preferred embodiment of the first combustion zone useful with the invention. The like-numbered elements of the figures are the same.

Referring now to FIG. 2, combustion zone 3 is cooled by external coolant 7, such as water or steam, which is passed through heat conducting metal tubes 31 surrounding combustion zone 3. More than 65 percent, preferably at least 70 percent of the heat released in the combustion is extracted from the combustion reaction products by the external coolant.

The main mode of heat transfer to the tube walls is by radiation from the hot combustion products. Radiative heat transfer is promoted by the high emissivity of sulfur dioxide formed in the substantially complete combustion of hydrogen sulfide and by the large temperature difference established between the hot combustion reaction products and the tube walls. As is known, the rate of radiative heat transfer is proportional to the difference of the absolute temperatures raised to the fourth power of the heat source and the heat receiving surface. Passing a coolant through metal tubes 31 keeps the receiving surface temperature low, thus heat is extracted at a high rate from the combustion reaction products.

In addition to facilitating the efficient extraction of more than 65 percent of the released heat, external cooling of combustion zone 3 as illustrated in FIG. 2, permits a substantially complete combustion of hydrogen sulfide with concentrated oxygen without heat damage to a refractory lining.

Oxidant 4 is introduced into combustion zone 3 preferably through post-mix burner 32 preferably at a high momentum to distribute the heat flux to metal tubes 31 uniformly along the longitudinal axis of the combustion zone. Generally, oxidant 4 is introduced at a velocity at least 300 ft/sec, preferably at a velocity higher than 500 ft/sec. The selected velocity is contingent on the size and geometry of the combustion zone. Preferably, the oxidant velocity and momentum is sufficient to cause recirculation of combustion reaction products within the first combustion zone. The recirculation within the first combustion zone facilitates heat transfer from the combustion reaction products to the external coolant.

The necessary surface area for extracting heat is provided by metal tubes 31 arranged in such a fashion as to define the length/diameter ratio of combustion zone 3 within the range of 1.5 to 6, preferably within the range of from 2 to 4. Any combination of oxidant velocity and combustion zone geometry can be used for practicing the process of this invention which leads to the extraction of at least 65 percent of the heat generated in the combustion zone.

Coolant 7 can be introduced into metal tubes 31 in any conventional way. A preferred embodiment is illustrated in FIG. 2, wherein the coolant effluent of heat exchanger section 6 is used to cool combustion zone 3. Coolant 7 can be recovered from the cooling circuit of combustion zone 3 as high quality steam 71.

Referring back to FIG. 1, the combustion reaction products are then passed into heat exchanger section 6 wherein the combustion products are further cooled by indirect heat exchange with coolant 7. Preferably, the combustion products are introduced without auxiliary piping directly into heat exchanger section 6 so that combustion zone 3 with its cooling circuit and heat exchanger section 6 can be constructed as a single unit as illustrated in both Figures. It is preferred that substantially all of the remaining combustion reaction heat be withdrawn from the combustion products in heat exchanger section 6. One of the advantages of the process of present invention is that by extracting substantially all of the combustion heat from the combustion products, the major part of the heat directly from combustion zone 3 and the remainder in heat exchanger section 6, the productivity of a Claus plant can be substantially increased without overloading the existing waste heat boiler or heat exchanger 12 downstream of the Claus reaction furnace.

Cooled stream 8 is passed into second combustion zone 9 which is the combustion zone of Claus reaction furnace 100. Also introduced into combustion zone 9 is major portion 10 of feed stream 1, and second oxidant 11 which may be air, oxyg-enenriched air or pure oxygen. One of the advantages of the process of this invention is that the oxygen concentration of second oxidant 11 may substantially exceed that of air without generating excessive temperatures which can ruin the refractories in reaction furnace 100. Streams 8 and 10 can be introduced into combustion zone 9 separately, as shown in the Figure, or can be premixed. In a particularly preferred embodiment of the invention, especially when the feed gas has a hydrogen sulfide concentration of at least 50 mole percent, both the first oxidant introduced into the first combustion zone and the second oxidant introduced into the second combustion zone are technically pure oxygen and the temperature in the second combustion zone is maintained below 2900° F.

Oxidant 11 is introduced into second combustion zone 9 in an amount sufficient to combust hydrogen sulfide to produce additional sulfur dioxide in such a proportion as to leave enough hydrogen sulfide uncombusted relative to the total sulfur dioxide produced in both combustion zones 3 and 9 to satisfy the stoichiometric requirement of the Claus reaction.

Optimum sulfur conversion is obtained in this reaction when the hydrogen sulfide-to-sulfur dioxide ratio is set to two, which is accomplished in prior art practice by combusting one-third of the hydrogen sulfide to sulfur dioxide. In contrast to this practice, the correct Claus stoichiometric ratio can be obtained in the process of present invention by the combustion of less than one-third of the hydrogen sulfide entering combustion zone 9. Reducing heat generation in this zone is a major advantage of the invented process.

The uncombusted fraction of the hydrogen sulfide progressively reacts with sulfur dioxide in reaction furnace 100 producing sulfur and steam according to the well known Claus reaction. The hot reaction stream is passed to waste heat boiler or heat exchanger 12 where the stream is cooled to a temperature which is generally above the dew point of sulfur. The thermal load on the waste heat boiler is reduced preferably at least in proportion to the heat extracted from the first combustion zone and to the heat extracted by the further cooling downstream of the first combustion zone.

The cooled reaction stream 13 emerging from waste heat boiler 12 comprising mainly steam, carbon dioxide, gaseous sulfur and some still unconverted sulfur compounds is passed to sulfur condenser 14 for the recovery of sulfur product 15 by condensation.

The gas effluent 16 of sulfur condenser 14, containing unreacted sulfur dioxide, hydrogen sulfide, and other sulfur compounds, is reheated and is passed through at least one catalytic converter to promote the conversion of the remaining sulfur compounds to sulfur catalytically. Sulfur is recovered in the catalytic stages conventionally and thus the process needs no further discussion.

As is evident to one skilled in the art, the present invention is a conceptually new approach to the temperature regulation problem in the reaction furnace of a Claus plant, which problem arises when oxygen is used for boosting production with an exothermic feed Instead of absorbing some of the heat released in the combustion reactions by a temperature moderating agent derived from an external source, the invention curbs the amount of heat released in the Claus furnace in the first place.

The exothermic chemical duty of the reaction furnace of a Claus plant is to completely oxidize all the hydrocarbons in the feed gas for catalyst protection in the catalytic stages and to combust about one-third of the hydrogen sulfide to sulfur dioxide for the Claus reaction.

In the present invention, the reaction furnace is relieved from that part of the thermal duty which is associated with the combustion of the acid gas diverted for precombustion. The sulfur dioxide formed in first combustion zone or precombustor doesn't have to be produced in the reaction furnace. Since the complete stoichiometric combustion of hydrogen sulfide yields two-thirds more sulfur dioxide than is required by the Claus stoichiometry, sulfur dioxide production and the corresponding heat release in the reaction furnace can be effectively reduced by precombusting only a relatively minor fraction of the feed gas with a stoichiometric amount of oxygen. The heats of combustion of hydrogen sulfide and of the hydrocarbons are withdrawn from the product upstream of the reaction furnace.

A fully precombusted gas stream 8 contains water and carbon dioxide besides sulfur dioxide which also play a role in regulating the temperature in zone 9 of the reaction furnace 100. These compounds are progressively converted to hydrogen and carbon monoxide at increasing temperatures in endothermic reactions. These chemical reactions have a peak shaving effect on the temperature developed in the combustion zone of the reaction furnace.

In addition to these mechanisms, heat is absorbed in the reaction furnace by the precombusted stream by changes in the sensible enthalpy of the gas. A major difference from other temperature moderating agents employed in prior art processes for temperature moderation is that the precombusted stream is derived from the acid gas feed which has to pass through the reaction furnace anyway. Nothing is superimposed on the active process stream. The temperature moderation obtained through the heat absorbing capacity of the precombustion products is a second order effect in the present invention. The main effect is obtained by shifting some of the exothermic chemical work necessary for the Claus reaction out of the reaction furnace.

The temperature within the second combustion zone in the Claus reaction furnace is primarily controlled by the distribution of the feed gas between the minor and major portions.

The following example is derived from a computer simulation and serves to further illustrate the process of the invention. The example is presented for illustrative purposes and is not intended to be limiting.

EXAMPLE

It is desired to recover sulfur employing the Claus process from an exothermic ultra-sour gas comprising about 90 mole percent hydrogen sulfide, 5 percent methane and 5 percent carbon dioxide. The production rate is limited by the designed maximum flow capacity of the plant. The flow rate limit is 400 pound moles per hour (lbmol/h) measured at the gas outlet of the first sulfur condenser. At higher flow rates than that, the pressure drop in the downstream catalytic stages becomes excessive. This limitation in the flow rate restricts the input of the sour feed gas to the reaction furnace to 126.5 lbmol/h when air is being used as an oxidant.

The sour feed gas processing capacity of the plant could be theoretically increased by the elimination of the nitrogen ballast from the process stream, i.e. by the replacement of the combustion air with pure oxygen. This cannot be done however, without damage to the refractories in the reaction furnace. The adiabatic flame temperature when combusting this exothermic gas with oxygen would reach about 3892° F. which is considerably above the 2750° F. maximum temperature tolerable in the furnace.

The gas processing capacity of the plant can be substantially increased by the process of the invention without exceeding the temperature and flow rate limitations at the plant. The flow rates given in this example refer to 1000 lbmol/h feed rate of the same ultra-sour gas which is specified above.

The feed gas is divided into a minor portion, comprising a stream at a flowrate of about 145 lbmol/h, and a major portion comprising the balance. The minor portion of the gas is introduced into an externally cooled first combustion zone, i.e. a precombustor such as is illustrated in the Drawings, along with technically pure oxygen having a purity of about 99.5 percent and supplied at a flow-rate of about 210 lbmol/h. The gas is substantially fully combusted with the supplied amount of oxygen while heat is extracted at a rate of about 22.7 million BTU per hour by indirect heat exchange with water which is introduced to metal tubes surrounding the combustion zone. About 72 percent of the combustion heat is extracted by the coolant this way which is then recovered as high pressure steam. The combustion reaction products are then passed directly into a heat exchange section where they are cooled to a temperature of about 600° F. by indirect heat exchange with water. The precombusted reaction products, comprising mainly steam, sulfur dioxide and carbon dioxide, exit the heat exchange section at a rate of about 290 lbmol/h and pass into the combustion zone of the Claus reaction furnace.

The major portion of the feed gas, flowing at a flowrate of 855 lbmol/h is introduced directly into the reaction furnace so that the combined sulfurous feed to the reaction furnace (feed gas and precombusted reaction products) is at a flowrate of 1145 lbmol/h having an average composition of 67.2 mole percent hydrogen sulfide, 11.4 percent sulfur dioxide, 12.7 percent water, 5.0 percent carbon dioxide and 3.7 percent methane.

The third gas stream entering the reaction furnace is technically pure oxygen, which is supplied at a rate of about 319 lbmol/h for the partial combustion of the major portion of the ultra-sour feed gas.

The methane is completely combusted, while the major fraction of the hydrogen sulfide remains uncombusted. The temperature reached in the combustion zone does not exceed 2695° F.

Sulfur dioxide formed in the precombustor and the sulfur dioxide formed in the reaction furnace reacts with uncombusted hydrogen sulfide producing sulfur. The reaction products are cooled in the waste heat boiler to 600° F., then are passed to the first sulfur condenser, wherein sulfur is withdrawn from the gas by condensation at 375° F. and is recovered as liquid.

The gas leaves the first sulfur condenser at a rate of 1205 lbmol/h. This gas is then conducted through three catalytic stages for further sulfur recovery.

The exothermic chemical duty of the reaction furnace was reduced, since 43.3 percent of the total sulfur dioxide required for producing sulfur from the undivided feed is produced in the precombustor. The overall energy balance (including the combustion of methane) shows that about 37 percent of the total heat is withdrawn upstream of the reaction furnace and only about 63 percent of it is withdrawn in the waste heat boiler of the reaction furnace. This shift in the thermal duty to the precombustor is mainly responsible for the fact that the temperature in the combustion zone of the reaction furnace can be kept safely below the 2750° F. temperature limit.

The increase in the sour gas processing capacity of the plant as compared to air practice is very substantial and is revealed by the following figures: Considering that 1205 lbmol/h gas leaves the first sulfur condenser per 1000 lbmol/h of feed gas input, the 400 lbmol/h flow rate limit is reached at 332 lbmol/h feed gas input to the plant. As compared to air practice, the sour gas processing rate of the plant is increased by a factor of 2.62 (332/126.5).

The process of this invention enables the construction of higher throughput Claus plants at a reduced capital cost. Moreover, existing Claus plants can be easily retrofitted for increasing production to the maximum limit set by the designed total fluid flow capacity of the plant. The existing plant equipment and piping can be left intact since the process unit required for practicing the invention is installed upstream of the reaction furnace. This unit can be started up or shut down on demand.

Although the process of this invention has been described in detail with reference to certain specific embodiments, those skilled in the art will recognized that there are other embodiments of the invention within the spirit and scope of the claims.

I claim:

1. A process for producing sulfur from a feed gas containing hydrogen sulfide comprising:
   (A) introducing a minor portion of the hydrogen sulfide containing feed gas into a single unit comprising (1) a first combustion zone having a heat conducting enclosure suitable for extracting heat by an external coolant passing through heat conducting metal tubes surrounding the first combustion zone and (2) a heat exchanger section without auxiliary piping therebetween;
   (B) introducing first oxidant containing at least 90 percent oxygen into the first combustion zone at a high velocity sufficient to cause recirculation of combustion reaction products within the first combustion zone;
   (C) combusting substantially all of the hydrogen sulfide to sulfur dioxide in said minor portion with the first oxidant within the first combustion zone to produce combustion reaction products, while extracting at least 65 percent of the heat generated by this combustion by radiative heat transfer from the combustion reaction products to the metal tubes surrounding the first combustion zone;

(D) passing the combustion reaction products from the first combustion zone directly into the heat exchanger section without passing through auxiliary piping, and withdrawing from the combustion reaction products in the heat exchanger section all of the remaining heat generated by the combustion in the first combustion zone;

(E) introducing the cooled combustion reaction products, second oxidant, and the major portion of the feed gas into a second combustion zone;

(F) combusting less than one-third of the hydrogen sulfide in the major portion of the feed gas with second oxidant in the second combustion zone to product additional sulfur dioxide;

(G) reacting sulfur dioxide and hydrogen sulfide to produce sulfur;

(H) cooling the products of the second combustion zone in a heat exchanger; and (I) recovering sulfur as product.

2. The process of claim 1 wherein the minor portion comprises less than 20 percent of the feed gas.

3. The process of claim 1 wherein the oxidant supplied to the second combustion zone has an oxygen concentration in excess of 21 percent.

4. The process of claim 1 wherein at least one of the oxidant supplied to the first combustion zone and the oxidant supplied to the second combustion zone is technically pure oxygen.

5. The process of claim 1 wherein the feed gas has a hydrogen sulfide concentration of at least 50 mole percent.

6. The process of claim 1 wherein heat from the cooling of the combustion reaction products is employed to produce steam.

7. The process of claim 1 wherein oxidant is supplied to the second combustion zone in an amount sufficient to produce an additional amount of sulfur dioxide sufficient to obtain a hydrogen sulfide to sulfur dioxide ratio about equal to 2.

8. The process of claim 1 wherein in the cooling of step (H) the thermal load on the heat exchanger is reduced at least in proportion to the heat extracted by the heat exchange carried out in steps (C) and (D).

9. The process of claim 1 wherein the temperature within the second combustion zone is controlled by the distribution of the feed gas between the minor and major portions.

10. The process of claim 1 further comprising passing the reaction stream containing unreacted sulfur dioxide, hydrogen sulfide, and other sulfur compounds to one or more catalytic reaction zones for the production and recovery of additional sulfur.

11. The process of claim 1 wherein at least 70 percent of the heat generated in the first combustion zone is extracted from the first combustion zone by the indirect heat exchange between the combustion reaction products and the external coolant.

12. The process of claim 1 wherein the external coolant is water.

13. The process of claim 1 wherein the combustion reaction products from the first combustion zone are further cooled by indirect heat exchange, and the coolant employed to carry out this further cooling is employed as the external coolant of the first combustion zone.

14. The process of claim 1 wherein the first oxidant is introduced into the first combustion zone at a velocity of at least 300 feet per second.

15. The process of claim 5 wherein both the first oxidant introduced into the first combustion zone and the second oxidant introduced into the second combustion zone are technically pure oxygen and the combustion in the second combustion zone is carried out while maintaining the temperature in the second combustion zone below 2900° F.

* * * * *

UNITED STATES PATENT AND TRADEMARK OFFICE
CERTIFICATE OF CORRECTION

PATENT NO. : 5,139,765
DATED     : August 18, 1992
INVENTOR(S) : A. G. Szekely

It is certified that error appears in the above-identified patent and that said Letters Patent is hereby corrected as shown below:

In column 3, line 57 delete "sep rate" and insert therefor --separate--.

In column 5, line 15 delete "oxyg-enenriched" and insert therefor --oxygen-enriched--.

In column 9, line 16 delete "product" and insert therefor --produce--.

Signed and Sealed this

Seventeenth Day of August, 1993

Attest:

BRUCE LEHMAN

Attesting Officer

Commissioner of Patents and Trademarks